Figure 3:
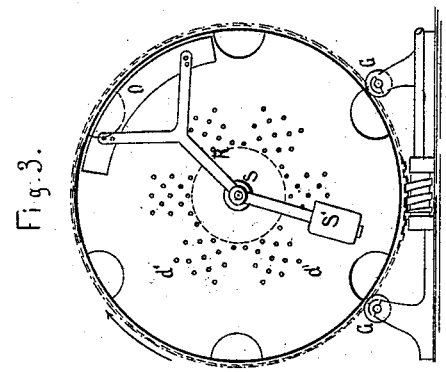

(No Model.)

J. HENNING.
PNEUMATIC MALTING DRUM.

No. 400,338. Patented Mar. 26, 1889.

Witnesses:

Inventor:
Julius Henning

UNITED STATES PATENT OFFICE.

JULIUS HENNING, OF CHARLOTTENBURG, NEAR BERLIN, GERMANY.

PNEUMATIC MALTING-DRUM.

SPECIFICATION forming part of Letters Patent No. 400,338, dated March 26, 1889.

Application filed September 29, 1888. Serial No. 286,772. (No model.) Patented in Belgium February 20, 1888, No. 80,706.

*To all whom it may concern:*

Be it known that I, JULIUS HENNING, a subject of the King of Prussia, residing at Charlottenburg, near Berlin, Kingdom of Prussia, Germany, have invented new and useful Improvements in Pneumatic Malting-Drums, (for which Letters Patent have been obtained in Belgium, No. 80,706, February 20, 1888,) whereof the following is a specification.

My invention relates to the pneumatic rotative malting-drums described in the specification of the British Patent No. 6,728, of April 23, 1884; and its object is to render more uniform and permanent the passage of the air through the mass of grain or malt contained in the drum. The said drum consists in a cylinder having head-plates with central apertures, a partition-plate forming with one of the head-plates an air-passage, a number of perforated peripherical conduits communicating with the said passage, and a perforated central conduit communicating with the aperture of the opposite head-plate, the drum being connected by one of its central apertures and suitable pipes to a suction or blowing apparatus, whereby a current of air is caused to pass through the same and to permeate the grain or malt contained therein. For the purpose of stirring the grain or malt, the drum is arranged to be slowly rotated. These drums as heretofore constructed are imperfect for three reasons—first, the perforations (holes or slits) through which the air issues from the grain or malt are apt to become choked with bran, germs, and particles of grain; secondly, as the drums are not filled entirely, and as the mass of material surrounding the central conduit is therefore less thick opposite to the empty space of the drum, the air passes too freely through the portion of reduced thickness; thirdly, the air-current having more or less an oblique direction from the inlet end of the induction conduit or conduits to the outlet end of the eduction conduits or conduit, the portions of material being in the corner formed by the central conduit and the partition-plate, to which it is fixed, are less supplied with air than the other portions.

In order to obviate these deficiencies, the perforations through which the air passes outward from the grain or malt are made flaring—*i. e.*, widening out in the direction of the air-current—an obstruction of the perforations by particles of the material being thereby avoided. Moreover, a plate is arranged in the aforesaid air-passage, whereby the peripherical conduits are closed at their open end when they are uncovered by material, and, finally, the partition-plate is provided with perforations establishing a communication between the air-passage and the interior of the drum, the said perforations allowing of an ingress of a portion of the air endwise into the body of the material, or an egress out of the same, according as the current may be directed.

Figure 2:
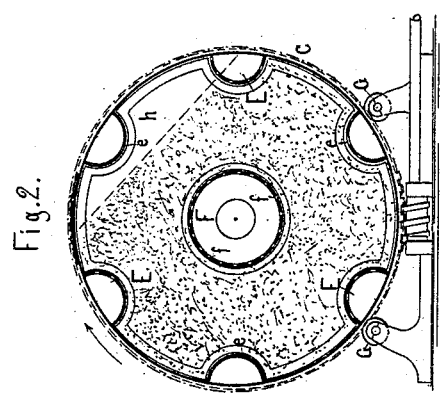
Figure 1:
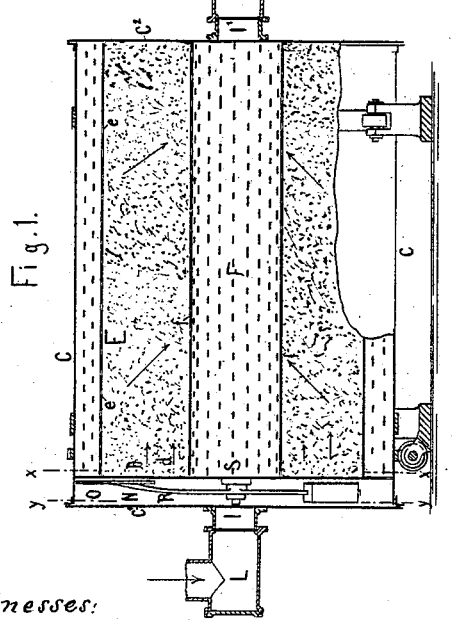
Figure 4:
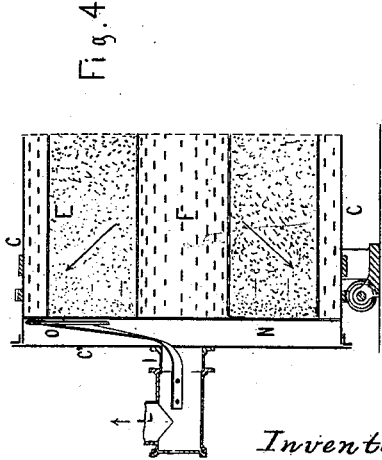

On the annexed sheet of drawings, Figure 1 represents in longitudinal sectional elevation a malting-drum provided with my improvements. Figs. 2 and 3 are transverse sections thereof on the respective lines $x\,x$ and $y\,y$. Fig. 4 shows a modification of the same, and Fig. 5 is a section of the central air-conduit drawn to a larger scale.

The drum consists in the cylinder C, the head-plates C' C², the partition-plate D, forming with the plate C' the air-passage N, the peripherical conduits E, communicating with the passage N and perforated toward the interior of the drum, and the perforated central conduit, F, communicating with the central aperture, I', of the plate C². The plate C' has the central aperture, I. To the rims of the apertures I and I' are riveted short tubular attachments rotatively connected with and suitably tightened against the respective stationary pipes L and K, one of which leads to a suction or blowing apparatus, (not shown in the drawings,) while through the other one moistened, cooled, heated, or other air is supplied or air issues, as the case may be. The drum is carried by the rollers G, and it is fitted with teeth H, with which gears the worm M for slowly rotating the same. A suitable door through which the material is introduced is in practice provided.

Figure 5:
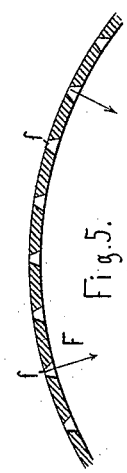

As regards the improvements, Figs. 1, 2, and 5 show the central conduit, F, provided with perforations $f$, of conical form, the narrower end of the same being at the surface of the conduit which is in contact with the material to be treated, so that all solid particles entering into the perforations will on passing the narrower end immediately find a wider sectional area and be carried onward by the current, which in this case is directed from the conduits E to the conduit F, as shown by the arrows in the said figures, the perforations thus remaining permanently free for the passage of air. If the current is directed inversely—*i. e.*, from the conduit F to the conduits E, as in Fig. 4—the perforations *e* of the latter are made conical. Instead of imparting to these perforations a round form, they may, however, also be made oblong, or in the form of slits, widening out in the direction of the current.

In order to close the conduits E at their open end when by the rotation of the drum they have come into the free space *h*, Fig. 2, or opposite to the portion of material of reduced thickness, the plate O is arranged in the air-passage N, opposite to the said space, the plate being placed forward of the vertical center line of the drum relatively to the direction of rotation of the latter, as, on account of the material being carried upward by the motion of the drum, the space *h* has such position. For keeping the plate O in the proper place it is fixed, as shown by Figs. 1 and 3, to one arm of a lever, R, pivoted on a pin, S, which projects from the partition-plate D, while the other arm of the lever is provided with a weight, S', being sufficiently heavy to keep the plate O always in the same position independently of the rotation of the drum. The said plate O may, however, also be fixed to an arm, R', Fig. 4, which in its turn is fastened to the pipe L.

*d* are the perforations through which air enters from the air-passage N endwise into the body of material in case the current is directed as in Fig. 1, and through which it issues endwise therefrom if the current has the opposite direction, as shown in Fig. 4. The said perforations are preferably arranged in groups alternating with the conduits E, and they may consist in round holes or in slits, as stated in respect to the perforations *e* and *f*. Besides, it is advantageous to make them widening out in the direction of the current the same as the latter.

I claim as my invention—

1. A rotating malting-drum having the head-plates C' C², with central apertures, I I', the partition-plate D, and the perforated conduits E and F, in combination with means, substantially as described, for creating a current of air from one of the apertures I I' to the other, the conduit or conduits through which the air issues from the drum having their perforations widening out in the direction in which the air-current passes through them, substantially as and for the purpose described.

2. The combination, with a rotating malting-drum having the head-plates C' C², with central apertures, I I', the partition-plate D, and the perforated conduits E and F, of the obturating-plate O, whereby the conduits E are closed during a part of the rotation of the drum, substantially as and for the purpose specified.

3. A rotating malting-drum having the head-plates C' C², with central apertures, I I', the partition-plate D, forming with the plate C' an air-passage, N, in one end of the drum, the peripheral conduits E, having inward apertures, and the central perforated or apertured conduit F, the partition-plate D having apertures opposite the chamber in the body portion of the drum, substantially as set forth.

In testimony whereof I have hereunto set my hand in the presence of two subscribing witnesses.

JULIUS HENNING.

Witnesses:
C. D. CARSTENS,
WILH. FLECK.